US008356082B2

(12) United States Patent  
Furuta (10) Patent No.: US 8,356,082 B2  
(45) Date of Patent: Jan. 15, 2013

(54) DATA COMMUNICATION SYSTEM FOR VEHICLE, ON-VEHICLE TERMINAL DEVICE, AND CENTER

(75) Inventor: Seiichi Furuta, Anjo (JP)

(73) Assignees: Toyota Jidosha Kabushiki Kaisha, Toyota-shi (JP); Denso Corporation, Kariya (JP)

( * ) Notice: Subject to any disclaimer, the term of this patent is extended or adjusted under 35 U.S.C. 154(b) by 379 days.

(21) Appl. No.: 12/574,361

(22) Filed: Oct. 6, 2009

(65) Prior Publication Data

US 2010/0094951 A1   Apr. 15, 2010

(30) Foreign Application Priority Data

Oct. 14, 2008   (JP) ................................. 2008-265337

(51) Int. Cl.  
*G06F 15/177*   (2006.01)

(52) U.S. Cl. ....... 709/217; 296/97.22; 701/36; 701/29.1

(58) Field of Classification Search .................. None  
See application file for complete search history.

(56) References Cited

U.S. PATENT DOCUMENTS

| 5,806,018 | A  | * | 9/1998 | Smith et al. ................... 701/538 |
| 6,484,088 | B1 | * | 11/2002 | Reimer ........................ 701/123 |
| 7,054,740 | B2 | * | 5/2006 | Chinomi et al. ............... 701/516 |
| 7,110,744 | B2 | * | 9/2006 | Freeny, Jr. .................... 455/406 |
| 7,526,294 | B2 | * | 4/2009 | Pfleging et al. ............. 455/456.2 |
| 2002/0198958 | A1 | * | 12/2002 | Frenkiel et al. ............... 709/217 |
| 2003/0031176 | A1 | * | 2/2003 | Sim ............................... 370/392 |
| 2003/0055924 | A1 |  | 3/2003 | Matsugatani |
| 2003/0204377 | A1 | * | 10/2003 | Royal et al. ................... 702/188 |
| 2004/0090346 | A1 | * | 5/2004 | Simonds et al. .............. 340/905 |
| 2004/0098179 | A1 | * | 5/2004 | Sokoloski et al. .............. 701/29 |
| 2005/0015434 | A1 | * | 1/2005 | He ................................ 709/202 |
| 2006/0259580 | A1 | * | 11/2006 | Laberteaux et al. .......... 709/217 |
| 2008/0021983 | A1 | * | 1/2008 | Dodson ........................ 709/219 |

(Continued)

FOREIGN PATENT DOCUMENTS

| JP | 2003-34201 | 2/2003 |
| JP | 2003-92639 | 3/2003 |
| JP | 2003-156339 | 5/2003 |
| JP | 2004-96973 | 3/2004 |

OTHER PUBLICATIONS

Office Action mailed Aug. 21, 2012, in Japanese Patent Application No. 2008-265337, filed Oct. 14, 2008.

*Primary Examiner* — Greg C Bengzon  
(74) *Attorney, Agent, or Firm* — Oblon, Spivak, McClelland, Maier & Neustadt, L.L.P.

(57) ABSTRACT

A controller of a navigation device judges whether or not there are data for which reception has been interrupted, based on data stored in a memory. When there are data for which reception has been interrupted, a distribution request of remaining data of the interrupted reception is transmitted to a center (50) through a data updating unit (310). A memory (55) of the center (50) stores the distribution request of the remaining data for which reception has been interrupted, which is transmitted from the navigation device (110). A controller (57) extracts the remaining data from the memory (55) based on the distribution request stored in the memory (55), and transmits the remaining data to the navigation device (110) through the data updating unit (310). After energy such as fuel is refilled, the user does not need to wait until the completion of the data communication.

8 Claims, 4 Drawing Sheets

U.S. PATENT DOCUMENTS

2008/0295586 A1* 12/2008 Fosseen ..................... 73/114.14
2008/0319605 A1* 12/2008 Davis ............................. 701/35
2010/0094496 A1* 4/2010 Hershkovitz et al. ........... 701/22
2010/0274440 A1* 10/2010 Kim et al. ....................... 701/33

* cited by examiner

DATA COMMUNICATION SYSTEM FOR VEHICLE, ON-VEHICLE TERMINAL DEVICE, AND CENTER

CROSS-REFERENCE TO RELATED APPLICATIONS

The entire disclosure of Japanese Patent Application No. 2008-265337, including the specification, claims, drawings, and abstract, is incorporated herein by reference.

BACKGROUND OF THE INVENTION

1. Field of the Invention

The present invention relates to a data communication system for a vehicle in which data communication is executed with a center through a data-updating unit of a fuel refilling device when fuel is refilled from the fuel refilling device to the vehicle, as well as to an on-vehicle terminal device and a center 2. Description of the Related Art Conventionally, there is known a data communication system for a vehicle in which, during fuel refilling of a vehicle from a fuel refilling device such as that at a gasoline station, data communication is executed between the vehicle and a center through a data updating unit of the fuel refilling device. With such a data communication system for a vehicle, because data are distributed to the vehicle through a data-distributing terminal provided in the fuel refilling device of the gasoline station, it is not necessary to execute the data communication through wireless communication, and, thus, the data communication time can be shortened.

Related Art Reference: JP 2003-34201 A

However, in this data communication system for a vehicle, when large-volume data such as video image data are communicated, the communication of all data cannot be completed during refilling of energy such as fuel, and, thus, the user may need to wait, after the energy refilling is completed, until the data communication is completed.

The present invention has been conceived in view of the above-described circumstances, and an advantage of the present invention is that a data communication system for a vehicle is provided in which the user does not need to wait until completion of data communication after energy is refilled.

SUMMARY OF THE INVENTION

According to one aspect of the present invention, there is provided a data communication system for a vehicle, which executes data communication between a vehicle and a center through a data updating unit of an energy refilling device when energy is refilled from the energy refilling device to the vehicle, wherein the vehicle comprises an on-vehicle terminal device comprising a communication possibility detecting unit which detects that communication with the data updating unit of the energy refilling device is possible; a receiving unit which receives, when the communication possibility detecting unit detects that communication is possible, data from the center through the data updating unit of the energy refilling device; a memory which stores data received by the receiving unit; an interruption judging unit which judges whether or not there are data for which reception has been interrupted, based on data stored in the memory; and a transmitting unit which transmits, when the interruption judging unit judges that there are data for which reception has been interrupted and the communication possibility detecting unit detects that communication is possible, a distribution request of remaining data of the interrupted reception to the center, and the center comprises a receiving unit which receives the distribution request; a memory which stores the distribution request received by the receiving unit of the center; and a transmitting unit which transmits the remaining data of the interrupted reception to the on-vehicle terminal device based on the distribution request stored in the memory of the center.

Even when the data reception of the on-vehicle terminal device is interrupted, the remaining data of interrupted reception can be received from the center the next time the energy is refilled. Therefore, the user does not need to wait until data communication is completed after the energy is refilled.

According to another aspect of the present invention, there is provided an on-vehicle terminal device which executes data communication with a center through a data updating unit of an energy refilling device when energy is refilled from the energy refilling device to a vehicle, the on-vehicle terminal device comprising a communication possibility detecting unit which detects that communication with the data updating unit of the energy refilling device is possible; a receiving unit which receives, when the communication possibility detecting unit detects that communication is possible, data from the center through the energy refilling device; a memory which stores data received by the receiving unit; an interruption judging unit which judges whether or not there are data for which reception has been interrupted, based on data stored in the memory; and a transmitting unit which transmits, when the interruption judging unit judges that there are data for which reception has been interrupted and the communication possibility detecting unit detects that communication is possible, a distribution request of remaining data of the interrupted reception to the center.

Even when the data reception of the on-vehicle terminal device is interrupted, the remaining data of the interrupted reception can be requested to the center the next time the energy is refilled. Thus, the user does not need to wait until completion of the data communication after the energy is refilled.

According to another aspect of the present invention, there is provided a center which executes data communication with a vehicle through a data updating unit of an energy refilling device when energy is refilled from the energy refilling device to the vehicle, the center comprising a receiving unit which receives, from the vehicle, a distribution request of remaining data for which the data communication has been interrupted; a memory which stores the distribution request received by the receiving unit; and a transmitting unit which transmits the remaining data of the interrupted communication to an on-vehicle terminal device based on the distribution request stored in the memory.

Even when data reception of the on-vehicle terminal device is interrupted, the center transmits to the on-vehicle terminal device the remaining data of the interrupted reception the next time energy is refilled. Therefore, the user does not need to wait for completion of the data communication after energy is refilled.

ADVANTAGES

The user does not need to wait until the completion of the data communication after energy is refilled.

BRIEF DESCRIPTION OF THE DRAWINGS

A preferred embodiment of the present invention will be described in detail by reference to the drawings, wherein.

DESCRIPTION OF THE PREFERRED EMBODIMENT

Next, a structure of a data communication system for a vehicle according to a preferred embodiment of the present invention will be described with reference to the drawings.

Figure 1:
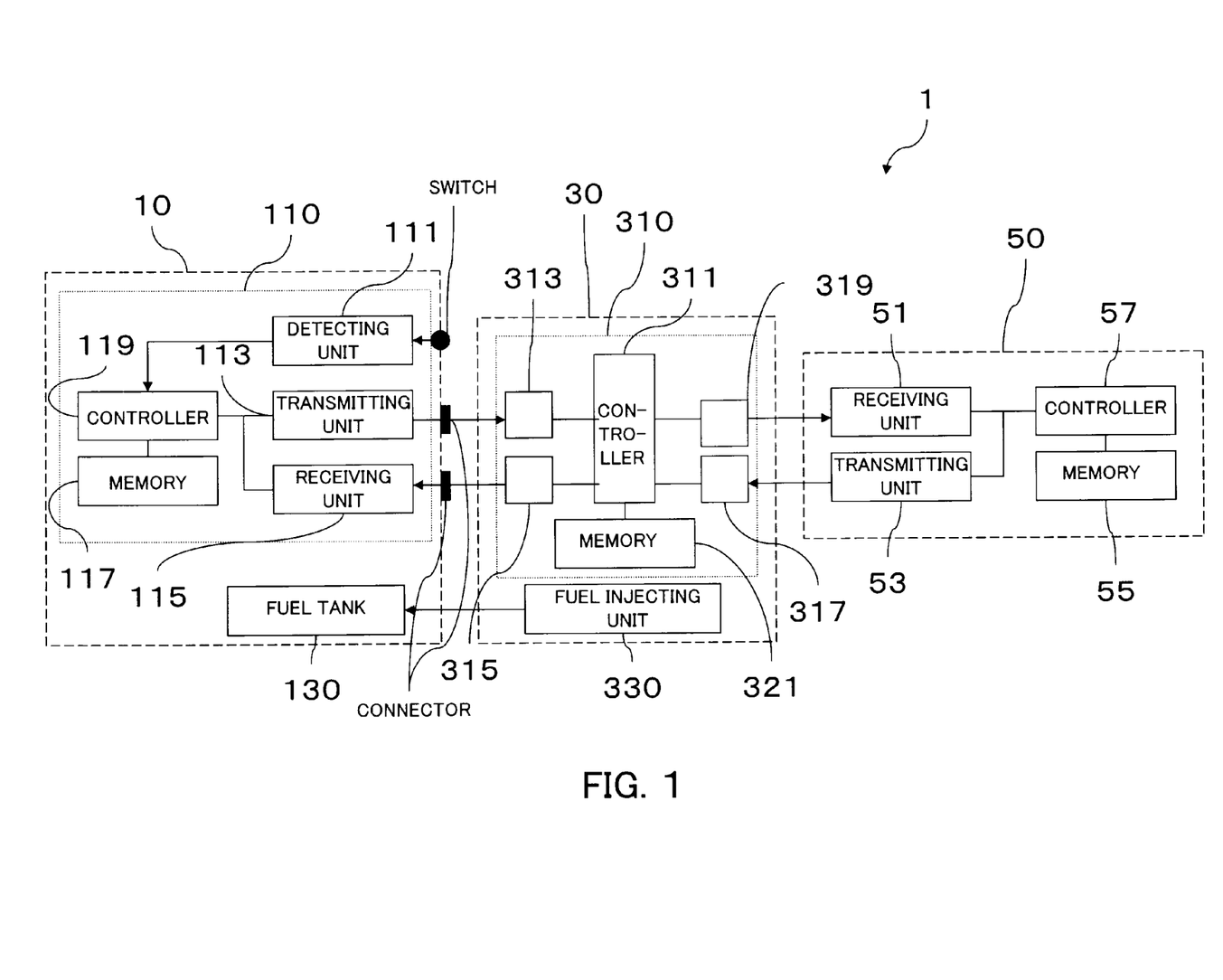
FIG. 1 is a block diagram showing a structure of a data communication system for a vehicle.

FIG. 1 is a block diagram showing a structure of a data communication system for a vehicle 1 according to a preferred embodiment of the present invention. The data communication system for a vehicle 1 comprises a vehicle 10, a fuel refilling device 30 of gasoline or the like, serving as an energy refilling device, and a center 50.

The vehicle 10 can run using fuel refilled from the fuel refilling device 30. In addition, the vehicle 10 communicates various data with the center 50 through the fuel refilling device 30.

The fuel refilling device 30 is placed at a predetermined location such as a gasoline station, and refills fuel to the vehicle 10. In addition, the vehicle 10 and the center 50 can communicate various data through the fuel refilling device 30.

The center 50 communicates various data with the vehicle 10.

Next, a data communication system for a vehicle according to the present embodiment will be described in more detail with reference to FIG. 1.

A structure of the vehicle 10 will first be described. The vehicle 10 comprises a navigation device 110 and a fuel tank 130.

The fuel tank 130 stores fuel for running the vehicle 10. The fuel is injected to the fuel tank 130 via an injection inlet provided on a side surface of the vehicle.

The navigation device 110 comprises a detecting unit 111, a transmitting unit 113, a receiving unit 115, a memory 117, and a controller 119. The navigation device 110 provides route guidance to the user by controlling a display (not shown) and a speaker (not shown). In addition, the navigation device communicates various data with the center 50 through the fuel refilling device 30. The vehicle 10 and the fuel refilling device 30 are connected with a wire through a connector, but may alternatively be connected wirelessly. At the start of communication, a predetermined handshake or the like is executed. For the communication protocol, a well-known protocol is suitably employed. In addition, the vehicle is connected to the center 50 through a public line or the like, for communication of various data. In general, the connection is achieved through the Internet. For the center 50, there is used an information center which is provided one at each control region which is set in advance and which executes information providing service, and the center 50 may be private or public.

The detecting unit 111 detects whether or not the fuel is being refilled from a fuel injecting unit 330 of the fuel refilling device 30 to the fuel tank 130. When the detecting unit 111 detects that the fuel is being refilled from the fuel injecting unit 330 to the fuel tank 130, the detecting unit 111 transmits to the navigation device 110 detection information indicating that fuel is being refilled. The detecting unit 111 preferably detects that the fuel is being refilled by, for example, switching ON of a switch, such as a press button provided near the injection inlet, being pressed when the fuel injecting unit 330 is inserted into the fuel tank 130.

The transmitting unit 113 transmits various data to the center 50 through the fuel refilling device 30. The transmitting device 113 is connected to a receiving unit 313 of a data updating unit 310 of the fuel refilling device 30 through a connector provided near the injection inlet, and transmits data to the receiving unit 313.

The detecting unit 111 may be any device which can detect that communication is possible with the fuel refilling device 30 (that is, any device which can function as a communication possibility detecting unit). In other words, it is also possible to detect that the device is connected to the data updating unit 310 of the fuel refilling device 30 through the connector, as will be described below. For example, the connection can be confirmed by the detecting unit 111 transmitting a connection request, recognizing that a response to the connection request is returned, and then executing a handshake. The fuel refilling device 30 starts communication with the center 50 when the connection with the vehicle 10 is confirmed, and connects the vehicle 10 and the center 50. The vehicle 10 transmits a distribution request to the center 50, and the center 50 transmits the requested data. Therefore, various data from the center 50 are supplied to the vehicle 10 through the fuel refilling device 30.

The receiving unit 115 receives various data from the center 50 through the fuel refilling device 30. The receiving unit 115 is connected to a transmitting unit 315 of the data updating unit 310 of the fuel refilling device 30 through a connector provided near the injection inlet, and receives data from the transmitting unit 315.

The memory 117 stores various data received by the receiving unit 115.

The various data received by the receiving unit 115 and stored in the memory 117 are data such as, for example, map data, music data, and facility data. Normally, the vehicle 10 specifies data and the specified data are transmitted by the center 50, but alternatively, the center 50 may provide a menu or the like, and the vehicle 10 may automatically select the necessary data by referring to the version of the data or the like.

The various data received by the receiving unit 115 and stored in the memory 117 include data information and index information. The data information is information actually displayed on or indicated from a display or a speaker such as an image in map data and sound in music data. The data information comprises a group of unit data which are divided into N pieces. Each unit data is assigned a number. The receiving unit 115 can receive each unit data individually, and the memory 117 can store each unit data individually.

The index information includes structure information of data which is placed at a head portion of the data and which includes information about the number N of unit data included in the data. The index information is also stored in the memory 117. The controller 119 recognizes the completion of data reception when N unit data are received at the receiving unit 115. In addition, it is also possible to attach identifiers of start and end for each unit data, set the length to a fixed length, or describe the size of each unit data in the index information, so that the controller 119 can recognize the completion of reception of the unit data.

The memory 117 stores the data continuous from the previous data every time reception of unit data is completed. Therefore, when the memory 117 stores all data, the stored data return to the state before being divided into the unit data. The controller 119 may again store the data information as one continuous piece of data when the controller 119 recognizes completion of reception of all data. During the reception of the data, the controller 119 stores, in the memory 117 as the reception completion information and for the stored data, to what part of the data the storage is completed.

The controller 119 controls the display and the speaker based on the data stored in the memory 117, and provides route guidance to the user. The controller 119 also judges whether or not there are data, among the data stored in the memory 117, for which reception has been interrupted. When the controller 119 judges that there are data for which the reception has been interrupted, the controller 119 transmits a distribution request of the remaining data of the interrupted reception from the transmitting unit 113 through the fuel refilling device 30 to the center 50.

More specifically, the controller 119 compares the structure information included in the index information of each data stored in the memory 117 with reception completion information, and, when the structure information includes a number which is not included in the reception completion information, the controller 119 transmits to the center 50 a distribution request of data corresponding to this number. For example, when numbers 1~i are included in the reception completion information stored in the memory among all unit data 1~N, the controller 119 transmits to the center 50 a distribution request of unit data of numbers (i+1)~N. The identification of the data is specified by an identification number, name, distribution data number, or the like included in the index information.

Next, the fuel refilling device 30 will be described with reference to FIG. 1.

The fuel refilling device 30 comprises the data updating unit 310 and the fuel injecting unit 330.

The fuel injecting unit 330 is a nozzle for injecting fuel into the fuel tank 130 of the vehicle 10. The user or an attendant at the gasoline station inserts the nozzle of the fuel injecting unit 330 into the injection inlet of the vehicle 10, and executes a predetermined operation, and the fuel is refilled from the fuel injecting unit 330 to the fuel tank 130.

The data updating unit 310 communicates various data with the navigation device 110. The data updating unit 310 comprises the receiving unit 313, the transmitting unit 315, a receiving unit 317, a transmitting unit 319, and a memory 321. The receiving unit 313 and the transmitting unit 315 are placed near the fuel injecting unit 330, and are connected to the connectors of the vehicle 10 when the fuel is refilled from the fuel injecting unit 330 to the fuel tank 130.

The receiving unit 313 is connected to the transmitting unit 113 of the navigation device 110 through a connector provided near the injection inlet of the vehicle 10. The receiving unit 313 receives a distribution request of data from the transmitting unit 113 when the receiving unit 313 is connected to the transmitting unit 113.

The transmitting unit 315 is connected to the receiving unit 115 of the navigation device 110 through a connector provided near the injection inlet of the vehicle 10. The transmitting unit 315 transmits to the receiving unit 115 various data stored in the memory 321 when the transmitting unit 315 is connected to the receiving unit 115.

The receiving unit 317 receives various data transmitted from the center 50.

The transmitting unit 319 transmits the distribution request stored in the memory 321 to the center 50.

The memory 321 stores the distribution request received from the navigation device 110 by the receiving unit 313 and various data received from the center 50 by the receiving unit 317. The memory 321 deletes various data which have already been transmitted from the transmitting unit 315 to the navigation device 110 and the distribution request which has already been transmitted from the transmitting unit 319 to the center 50, and stores only various data which have not yet been transmitted and the distribution request which has not yet been transmitted.

A controller 311 controls the receiving unit 313, the transmitting unit 315, the receiving unit 317, the transmitting unit 319, and the memory 321. More specifically, the controller 311 instructs the memory 321 to store the distribution request which is received from the navigation device 110 by the receiving unit 313 and various data which are received from the center by the receiving unit 317. In addition, the controller 311 instructs various data stored in the memory 321 to be transmitted from the transmitting unit 315 to the navigation device 110 and the distribution request stored in the memory 321 to be transmitted from the transmitting unit 319 to the center 50. The controller 311 instructs sequential transmission of the structure information, among the data to be transmitted to the navigation device 110, and then, the divided unit data and the reception completion information corresponding to each unit data.

Next, the center 50 will be described with reference to FIG. 1. The center 50 transmits various data through the fuel refilling device 30 to the navigation device 110 based on the distribution request received from the navigation device 110 of the vehicle 10 through the fuel refilling device 30. In addition, when the center 50 receives the distribution request of the remaining data of interrupted reception from the navigation device 110, the center 50 transmits the remaining data to the navigation device.

The center 50 comprises a receiving unit 51, a transmitting unit 53, a memory 55, and a controller 57.

The receiving unit 51 receives the distribution request transmitted from the transmitting unit 319 of the data updating unit 310.

The transmitting unit 53 transmits various data stored in the memory 55 to the receiving unit 317 of the data updating unit 310.

The memory 55 stores various data to be transmitted to the navigation device 110 through the fuel refilling device 30. The memory also stores the distribution request received by the receiving unit 51 from the data updating unit 310.

The controller 57 reads the distribution request stored in the memory 55, and instructs various data to be transmitted from the transmitting unit 53 to the data updating unit 310 according to the read distribution request. The controller 57 instructs sequential transmission of the structure information, among the data to be transmitted to the data updating unit 310, and then the divided unit data and the reception completion information corresponding to each unit data.

When the distribution request which is read by the controller 57 from the memory 55 is a distribution request of remaining data of data for which reception has been interrupted by the navigation device 110, the controller 57 reads, in response to the distribution request, the remaining data of the interrupted reception of the navigation device 110 from among various data stored in the memory 55 and instructs transmission of the data from the transmitting unit 53 to the data updating unit 310. For example, when the controller 57 reads the distribution request of unit data of numbers (i+1)~N stored in the memory 55, the controller 57 reads the unit data corresponding to the numbers (i+1)~N and the reception completion information corresponding to each unit data from the memory 55, and instructs transmission of the data from the transmitting unit 53.

Figure 2:
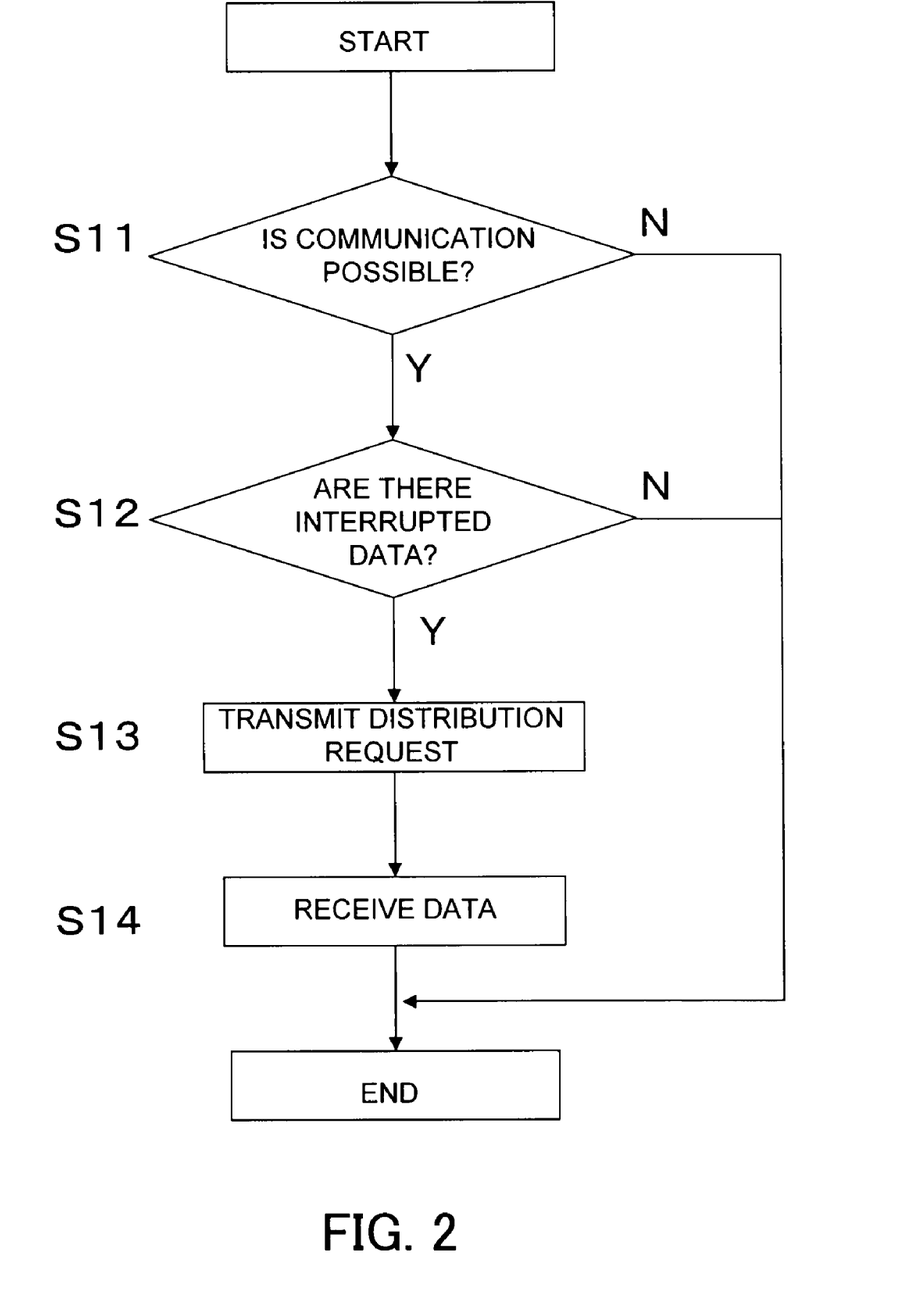
FIG. 2 is a flowchart showing an operation of a navigation device.
Figure 3:
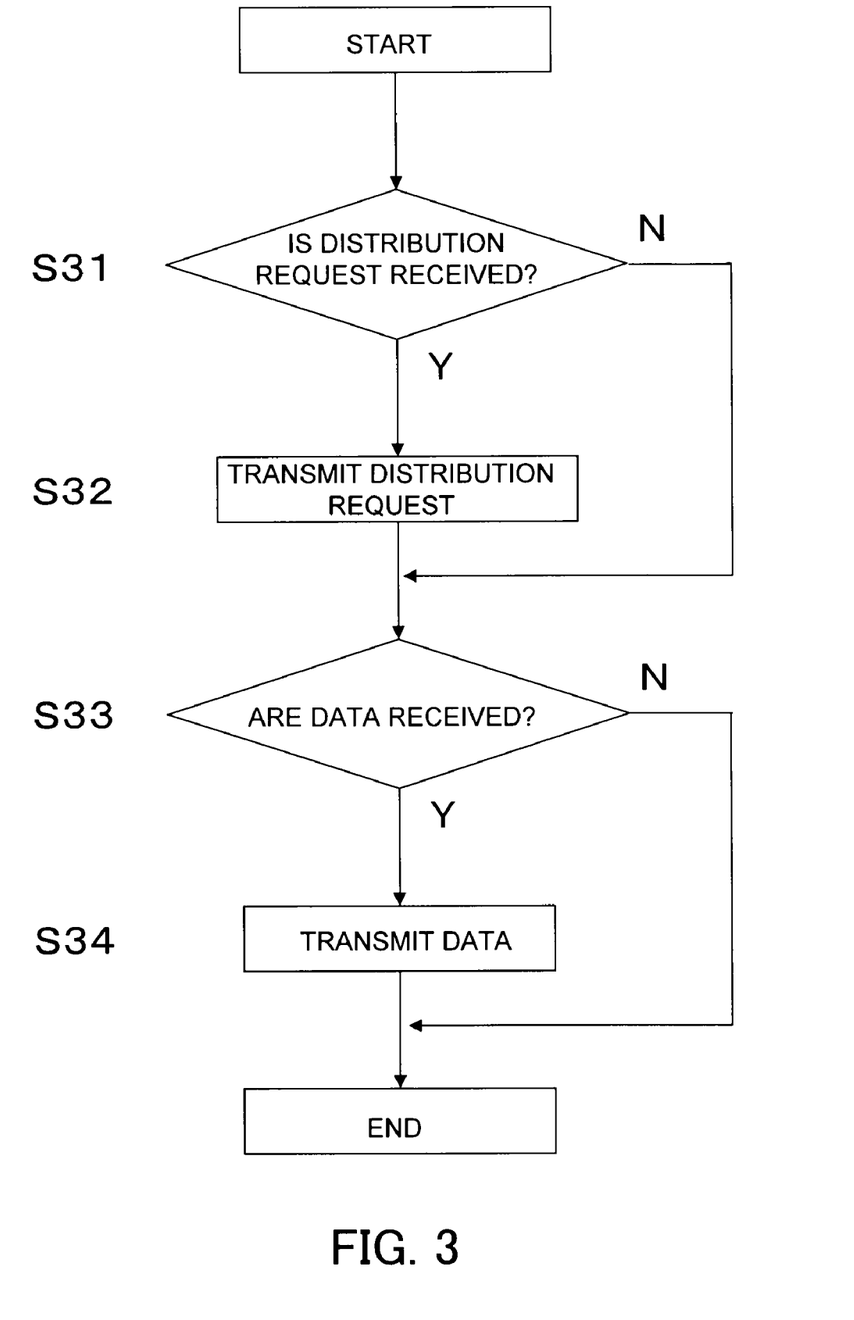
FIG. 3 is a flowchart showing an operation of a fuel refilling device.
Figure 4:
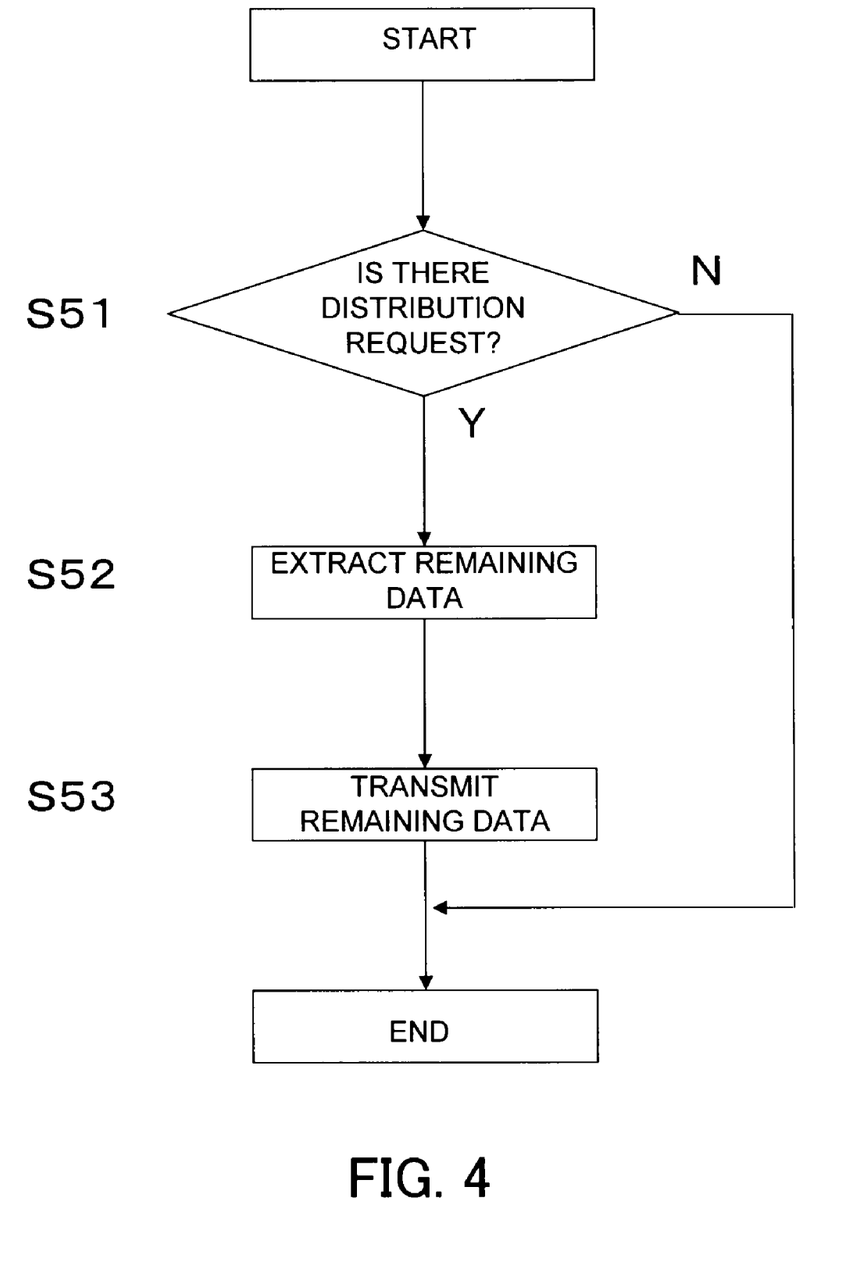
FIG. 4 is a flowchart showing an operation of a center.

Next, an operation of the data communication system for a vehicle 1 will be described with reference to flowcharts of FIGS. 2-4.

First, with reference to FIG. 2, an operation performed when the navigation device 110 transmits the distribution request of the remaining data of interrupted reception will be described.

In S11, the detecting unit 111 detects whether or not the detecting switch is in the ON state, to detect whether or not communication between the navigation device 110 and the data updating unit 310 is possible. When it is not detected that the communication is possible, the navigation device 110 completes the present operation. When it is detected that the communication is possible, the process proceeds to S12.

In S12, the controller 119 reads data stored in the memory 117, compares the structure information and reception completion information of each data, and judges whether or not there are data for which reception has been interrupted. When there are data for which reception has been interrupted, a flag indicting that there are interrupted data may be set, to facilitate the judgment of whether or not there are interrupted data. When it is judged that there are no data for which reception has been interrupted, the navigation device 110 completes the present process. When it is judged that there are data for which reception has been interrupted, the process proceeds to S13.

In S13, the controller 119 creates a distribution request of remaining data of the interrupted reception based on the structure information and reception completion information of the data for which reception has been interrupted. Then, the controller 119 transmits the created distribution request of the remaining data to the data updating unit 310 through the transmitting unit 113.

Next, in S14, the receiving unit 115 receives the remaining data of the interrupted reception which has been transmitted from the center 50 through the data updating unit 310. The controller 119 instructs the data received by the receiving unit 115 to be stored in the memory 117. With this process, the navigation device 110 completes the operation for the present distribution request transmission.

Next, with reference to FIG. 3, an operation performed when the data updating unit 310 transmits the distribution request and various data will be described.

First, in S31, the controller 311 judges whether or not a distribution request transmitted from the navigation device 110 is stored in the memory 321. When a distribution request is stored in the memory 321, the process proceeds to S32. When, on the other hand, no distribution request is stored in the memory 321, the process proceeds to S33.

In S32, the controller 311 transmits the distribution request stored in the memory 321 to the center 50 through the transmitting unit 319. The controller 311 deletes, from the memory 321, the distribution request transmitted to the center 50.

Then, in S33, the controller 311 judges whether or not data transmitted from the center 50 are stored in the memory 321. When no data transmitted from the center 50 are stored in the memory 321, the present operation is completed. When, on the other hand, data transmitted from the center 50 are stored in the memory 321, the process proceeds to S34.

In S34, the controller 311 transmits the data stored in the memory 321 to the navigation device 110 through the transmitting unit 315. The controller 311 deletes, from the memory 321, the data transmitted to the navigation device 110. With this process, the data updating unit 310 completes the present operation for transmitting the distribution request and various data.

Next, with reference to FIG. 4, an operation performed when the center 50 transmits the remaining data for which reception by the navigation device 110 has been interrupted will be described.

First, in S51, the controller 57 judges whether or not a distribution request of remaining data of interrupted reception is stored in the memory 55. When no distribution request is stored in the memory 55, the present operation is completed. When a distribution request is stored in the memory 55, the process proceeds to S52.

In S52, the controller 57 extracts, from the memory 55, the remaining data for which reception by the navigation device 110 has been interrupted, based on the distribution request stored in the memory 55.

Then, in S53, the controller 57 transmits the remaining data for which the reception by the navigation device has been interrupted, which are extracted from the memory 55, to the data updating unit 310 through the transmitting unit 53. With this process, the center 50 completes the present operation for data transmission.

In the above-described preferred embodiment, a configuration is employed in which the detecting unit 111 detects whether or not the communication between the navigation device 110 and the data updating unit 310 is possible, by detecting whether or not the detecting switch is in the ON state. Alternatively, it is also possible to employ a configuration in which the controller 311 of the data updating unit 310 transmits a predetermined signal to the navigation device 110 through the transmitting unit 315 when the data updating unit 310 and the navigation device 110 are connected through the connector and the controller 119 of the navigation device 110 detects that communication is possible when the receiving unit 115 receives the predetermined signal.

In addition, in the above-described preferred embodiment, a configuration is employed in which communication is executed when the navigation device 110 and the data updating unit 310 are connected through a connector. Alternatively, it is also possible to employ a configuration in which the navigation device 110 and the data updating unit 310 wirelessly communicate with each other through a coil antenna provided near the injection inlet of the vehicle and a coil antenna provided near the nozzle of the fuel injecting unit 330.

Moreover, in the above-described preferred embodiment, the on-vehicle terminal device equipped in a vehicle is described as a navigation device, but the device is not limited to the navigation device, and may be any device which is operated by receiving data from the center.

In the above-described embodiment, because the data communication is executed when the communication between the fuel refilling device 30 and the vehicle through the connector or the coil antenna provided near the injection inlet becomes possible, it is possible to detect that the communication is possible with a lower power as compared with wireless communication at a hot spot or the like.

In the above-described preferred embodiment, a configuration is employed in which the data communication is executed when fuel is refilled to the vehicle, but the configuration is not limited to the time of the fuel refilling, so long as the data are communicated when energy is refilled. For example, a configuration may be employed in which data are communicated when electrical energy is refilled from an electric energy refilling device provided in a charging station or the like to the vehicle.

As described, according to the present embodiment, even when data reception of the on-vehicle terminal device is interrupted, the on-vehicle terminal device can transmit a distribution request of the remaining data of the interrupted reception to the center the next time the energy is refilled, the center can transmit the remaining data in response to the distribution request, and the on-vehicle terminal device can receive the remaining data from the center. Therefore, the user does not need to wait until the completion of the data communication after the energy is refilled.

In addition, because the on-vehicle terminal device which receives the data identifies the remaining data for which reception has been interrupted, it is possible for the on-vehicle terminal device to reliably receive the remaining data of the interrupted reception.

What is claimed is:

1. A data communication system for a vehicle, which executes data communication between the vehicle and a center apparatus through a data updating unit of an energy refilling device when energy is refilled from the energy refilling device to the vehicle, wherein
the vehicle comprises an on-vehicle terminal device comprising:
 a communication possibility detecting unit which detects that communication with the data updating unit of the energy refilling device is possible when the energy refilling device is connected to the vehicle;
 a receiving unit which receives, when the communication possibility detecting unit detects that communication is possible, data from the center apparatus through the data updating unit of the energy refilling device;
 a memory which stores data received by the receiving unit;
 an interruption judging unit which judges whether or not there are data for which reception has been interrupted, based on data stored in the memory; and
 a transmitting unit which transmits, when the interruption judging unit judges that there are data for which reception has been interrupted and the communication possibility detecting unit detects that communication is possible, a distribution request of remaining data of the interrupted reception to the center apparatus, and
the center apparatus comprises:
 a receiving unit which receives the distribution request;
 a memory which stores the distribution request received by the receiving unit of the center apparatus; and
 a transmitting unit which transmits the remaining data of the interrupted reception to the on-vehicle terminal device based on the distribution request stored in the memory of the center apparatus, wherein
the communication possibility detecting unit of the on-vehicle device detects that communication with the data updating unit of the energy refilling device is possible when the energy refilling device is connected to the vehicle by the energy refilling device activating a switch provided near an injection inlet of the vehicle such that the switch is physically activated by inserting the energy refilling device into the injection inlet,
when the switch is physically activated, the transmitting unit of the on-vehicle device transmits the distribution request when the interruption judging unit judges that there are data for which reception has been interrupted, and
the data received by the receiving unit includes sound data, image data, or sound and image data.

2. An on-vehicle terminal device which executes data communication with a center apparatus through a data updating unit of an energy refilling device when energy is refilled from the energy refilling device to a vehicle, the on-vehicle terminal device comprising:
 a communication possibility detecting unit which detects that communication with the data updating unit of the energy refilling device is possible when the energy refilling device is connected to the vehicle;
 a receiving unit which receives, when the communication possibility detecting unit detects that communication is possible, data from the center apparatus through the energy refilling device;
 a memory which stores data received by the receiving unit;
 an interruption judging unit which judges whether or not there are data for which reception has been interrupted, based on data stored in the memory; and
 a transmitting unit which transmits to the center apparatus, when the interruption judging unit judges that there are data for which reception has been interrupted and the communication possibility detecting unit detects that communication is possible, a distribution request of remaining data of the interrupted reception, wherein
the communication possibility detecting unit of the on-vehicle device detects that communication with the data updating unit of the energy refilling device is possible when the energy refilling device is connected to the vehicle by the energy refilling device activating a switch provided near an injection inlet of the vehicle such that the switch is physically activated by inserting the energy refilling device into the injection inlet,
when the switch is physically activated, the transmitting unit of the on-vehicle device transmits the distribution request when the interruption judging unit judges that there are data for which reception has been interrupted, and
the data received by the receiving unit includes sound data, image data, or sound and image data.

3. The data communication system for a vehicle according to claim 1, wherein the energy refilling device is a fuel refilling device.

4. The on-vehicle terminal device according to claim 2, wherein the energy refilling device is a fuel refilling device.

5. The data communication system for a vehicle according to claim 1, wherein the center apparatus divides data to be transmitted into units of a fixed length and transmits the data, and, during the transmission, the center apparatus also transmits index information regarding a number of divisions.

6. The data communication system for a vehicle according to claim 1, wherein the activating of the switch by the energy refilling device is a determinative factor, by the communication possibility detecting unit, to detect whether the communication with the data updating unit of the energy refilling device is possible.

7. The data communication system for a vehicle according to claim 1, wherein the data received by the receiving unit includes image data that forms an image in map data.

8. The on-vehicle terminal device according to claim 2, wherein the data received by the receiving unit includes image data that forms an image in map data.

* * * * *